United States Patent [19]
Milburn

[11] Patent Number: 5,758,058
[45] Date of Patent: May 26, 1998

[54] APPARATUS AND METHOD FOR INITIALIZING A MASTER/CHECKER FAULT DETECTING MICROPROCESSOR

[75] Inventor: Blair D. Milburn, Beaverton, Oreg.

[73] Assignee: Intel Corporation, Santa Clara, Calif.

[21] Appl. No.: 607,523

[22] Filed: Feb. 27, 1996

Related U.S. Application Data

[63] Continuation of Ser. No. 40,401, Mar. 31, 1993, abandoned.

[51] Int. Cl.$^6$ ............................ G06F 11/16; G06F 11/18; G06F 7/02
[52] U.S. Cl. .......................... 395/182.09; 395/182.08; 371/67.1; 371/68.1
[58] Field of Search ............... 395/182.08, 182.09, 395/700; 371/68.1, 67.1

[56] References Cited

U.S. PATENT DOCUMENTS

| | | | |
|---|---|---|---|
| 4,176,258 | 11/1979 | Jackson | 371/68.1 |
| 4,785,453 | 11/1988 | Chandran et al. | 371/51.1 |
| 4,792,955 | 12/1988 | Johnson et al. | 395/182.08 |
| 4,860,196 | 8/1989 | Wengert | 395/550 |
| 4,903,270 | 2/1990 | Johnson et al. | 371/68.1 |
| 4,916,695 | 4/1990 | Ossfeldt | 371/9.1 |
| 4,937,741 | 6/1990 | Harper et al. | 395/550 |
| 4,975,831 | 12/1990 | Nilsson et al. | 395/800 |
| 5,054,026 | 10/1991 | Tsubota | 371/68.3 |
| 5,115,511 | 5/1992 | Nilsson et al. | 395/800 |
| 5,136,595 | 8/1992 | Kimura | 371/68.3 |
| 5,157,780 | 10/1992 | Stewart et al. | 395/575 |
| 5,226,152 | 7/1993 | Klug et al. | 395/575 |
| 5,233,615 | 8/1993 | Goetz | 371/36 |
| 5,410,710 | 4/1995 | Sarangdhar et al. | 395/739 |

*Primary Examiner*—Robert W. Beausoliel, Jr.
*Assistant Examiner*—P. Vales
*Attorney, Agent, or Firm*—Blakely, Sokoloff, Taylor & Zafman

[57] ABSTRACT

A method and apparatus for initializing both processors in a master/checker fault detecting microprocessor. A microcode initialization routine is run by each processor upon reset of both of the processors in the pair. The routines cause each processor to be initialized, such that the two processors complete initialization at the same time and operate in a lock-step manner.

11 Claims, 6 Drawing Sheets

APPARATUS AND METHOD FOR INITIALIZING A MASTER/CHECKER FAULT DETECTING MICROPROCESSOR

This is a continuation of application Ser. No. 08/040,401, filed Mar. 31, 1993, now abandoned.

FIELD OF THE INVENTION

The present invention relates to the field of computer systems; particularly, the present invention relates to the field of master/checker fault detecting microprocessor computer systems.

BACKGROUND OF THE INVENTION

One method of detecting errors in a microprocessor is by a redundancy method known as functional redundancy checking (FRC). The basic FRC mechanism is to simply read (input) the value of each pin when the processor is driving that signal and compare the value with an internal version of what the microprocessor was intending to drive. For a single processor system, the FRC mechanism will detect a bad output buffer, shorts of the board trace to Vcc, Vss (i.e., ground) or another signal and fights on the bus if another agent(s) is over-driving the microprocessor output buffers.

Another mechanism which can be used to achieve a computer system with fault detection is to run two processors in lock-step. In U.S. Pat. No. 4,176,258 of Daniel Jackson, granted on Nov. 27, 1979 and assigned to Intel Corporation, a FRC mechanism for a microprocessor is shown. In this method, an integrated circuit component is duplicated and output signals from the two identical components are compared in FRC logic. An error condition is reported if the output signals do not match one another.

Figure 1:
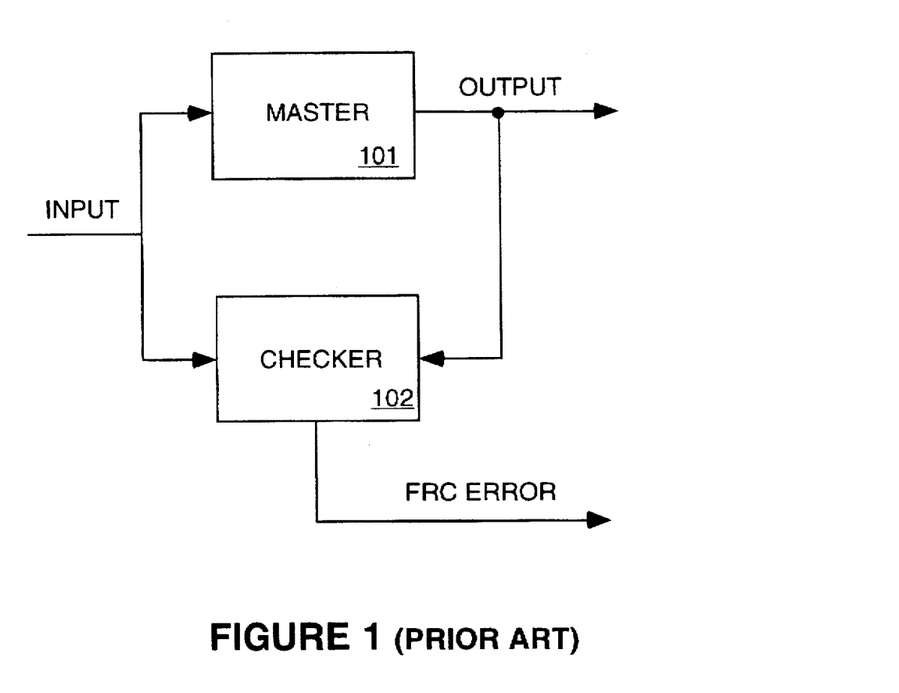
- FIG. 1 illustrates a prior art fault redundancy checking system.

Each processor in the lock-step pair is processing the same program using the same data. The output lines of each are tied together and the results are checked. If the output lines disagree, a fault is detected. This type of configuration is referred to as a master/checker fault detecting system. A prior art master/checker fault detecting system is shown in FIG. 1. Referring to FIG. 1, master 101 and checker 102 are both coupled to receive the same inputs, while the output of the pair is taken from the output of master 101. The output is also coupled to be received by checker 102. Checker 102 outputs the FRC error if the outputs from master 101 do not match its outputs. Note that the master and checker could be any logical device.

When two processors are coupled together as a master/checker pair, the outputs of the checker are tristated. In this case, the master still detects the previous mentioned errors. The checker runs in lock-step with the master so the same mechanism checks what is being driven on the bus against what the checker would be driving if it were not tristated. The additional coverage provided by the master/checker pairs is that errors in the logic internal to the microprocessor are detected.

One difficulty in creating such a master/checker fault detecting system is that each processor must run in lock-step. That is, both processors must execute exactly the same instruction at the exact same time and produce the same result. Initializing the two processors so that they are both executing in lock-step from time zero (when the processors are reset) is a difficult task. If this initialization is incorrect, an error will be detected the first time the processor issues the memory access to the outside world (such as when it to read a boot record).

One prior art method to ensure that the two processes operate in lock-step is to reset the master and wait a certain amount of time before actually turning on the checker. In this manner, the timing could be such that the checker could be ready to accept inputs when the master generates its outputs. Another method of providing for lock-step operation is to ensure that all hardware initializes to a certain known state. By initializing to a known state, the processor can achieve lock-step because both processors can start from the same state. Note that is difficult to implement this because it is too late in the design process to identify what the known state should be. That is, in the design process of a processor, a larger simulation is typically not run which would indicate whether an unknown state exists until the parts are fabricated. Thus, if the unknown accesses come to the pins, it is difficult to fix.

Another prior art technique to initialize the master and checker pair is to wait until the two processors settle, by bringing up each processor separately and then synchronizing them by sending each other a message indicating that they should begin checking. However, time is wasted by bringing up one of the processors and then the other. Furthermore, a mechanism is required to cause one of the processors to halt while the other processor catches up. In other words, one processor (e.g., the master) would power up to the ready state for a predetermined period of time (i.e., a thousand clocks) or until all the internal state is known to be stable. At that time, a signal is sent out by the processor (i.e. the master) which would start the other processor (i.e., the checker) to proceed for a thousand clocks and then indicate it is ready. Thus, a handshaking protocol must exist between the two to allow them both to begin at the same place and time in the program state.

Another prior art method for synchronizing the master and checker upon start-up is to utilize resettable latches which are reset upon the assertion of the reset signal. Therefore, all of the logic may be reset at the same time. A problem with this approach is that it requires extra hardware.

The present invention provides devices which are able to operate in master/checker mode through the use of various microcode instructions executed during the reset sequence to ensure that two processors will be in lock-step before the first memory access is made. Thus, the present invention provides a microcode initialization routine.

SUMMARY OF THE INVENTION

A method and apparatus for initializing both processors in a master/checker fault detecting microprocessor is described. The present invention includes a method and apparatus for asserting a reset signal, thereby causing the first and second microprocessors to be reset. In one embodiment, after being reset, both processors are designated as checkers. The present invention also includes a method and apparatus for signaling a microcode routine in both processors. This causes both processors to begin executing their own microcode routines at the same time. In the present invention, these microcode routines are identical. The result of the execution of the microcode routines causes the internal state of each processor to be initialized to a known value and causes each processor to be designated as the master or checker in the pair. The designations are such that the two processors complete initialization at the same time, so that the two processors operate in a lock-step manner.

BRIEF DESCRIPTION OF THE DRAWINGS

The present invention will be understood more fully from the detailed description given below and from the accom

DETAILED DESCRIPTION OF THE INVENTION

An apparatus and method for initializing a master/checker fault detecting microprocessor is described. In the following detailed description of the present invention numerous specific details are set forth in order to provide a thorough understanding of the present invention. However, it will be obvious to one skilled in the art that the present invention may be practiced without these specific details. In other instances well known methods, functions, components and procedures have not been described in detail as not to unnecessarily obscure the present invention.

Figure 2:
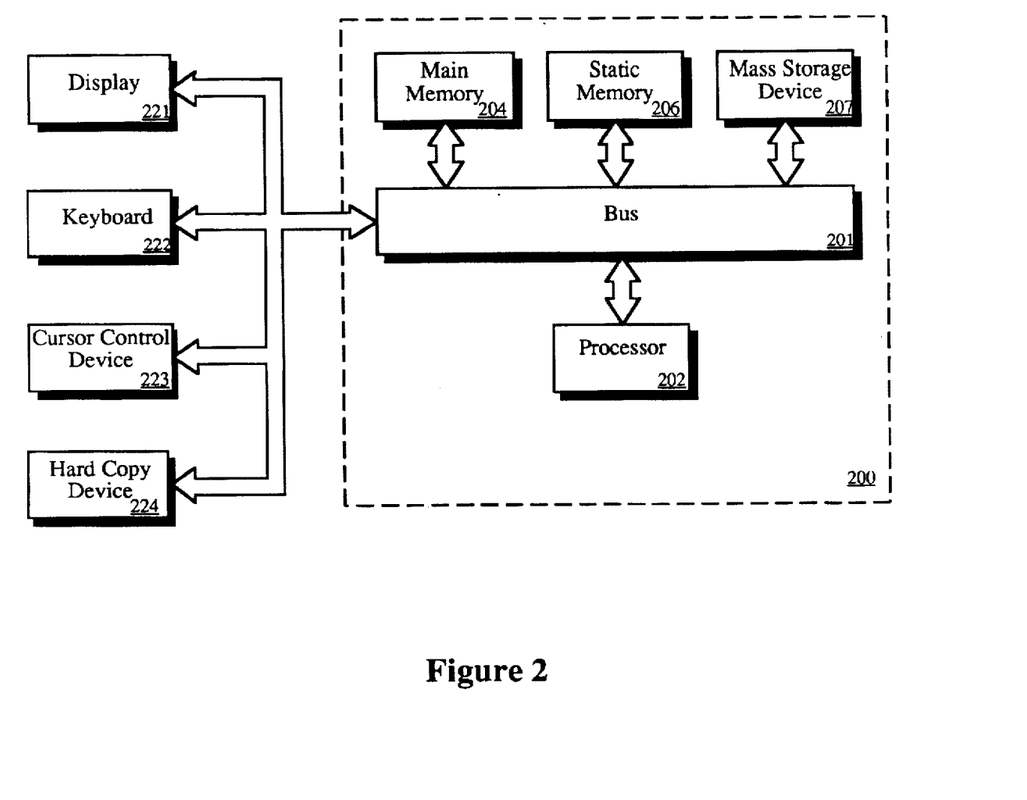
FIG. 2 is a block diagram of the computer system of the present invention.

Referring first to FIG. 2, an overview of a computer system of the present invention is shown in block diagram form. It will be understood that while FIG. 2 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 2, a computer system, as may be utilized by the preferred embodiment of the present invention, generally comprises a bus or other communications means 201 for communicating information, a processor 202 coupled with bus 201 for processing information, a random access memory (RAM) or other dynamic storage device 204 (commonly referred to as a main memory) coupled with bus 201 for storing information and instructions for processor 202, a read only memory (ROM) or other static storage device 206 coupled with bus 201 for storing static information and instructions for processor 202, a data storage device 207, such as a magnetic disk and disk drive, coupled with bus 201 for storing information and instructions. Note that in the currently preferred embodiment, processor 202 comprises a fault redundancy checking (FRC) processor.

The computer system also includes a display device 221, such as a cathode ray tube, liquid crystal display, etc., coupled to bus 201 for displaying information to the computer user, an alphanumeric input device 222 including alphanumeric and other keys, etc., coupled to bus 201 for communicating information and command selections to processor 202 and a cursor control device 223 coupled to bus 201 for controlling cursor movement. Moreover, the system includes a hard copy device 224, such as a plotter or printer, for providing a visual representation of the computer images. Hard copy device 224 is coupled with processor 202, main memory 204, static memory 206 and mass storage device 207 through bus 201.

Of course, certain implementations and uses of the present invention may not require nor include all of the above components. For example, in certain implementations a keyboard and cursor control device for inputting information to the system may not be required. In other implementations, it may not be required to provide a display device for displaying information.

The Processor of the Present Invention

Figure 3:
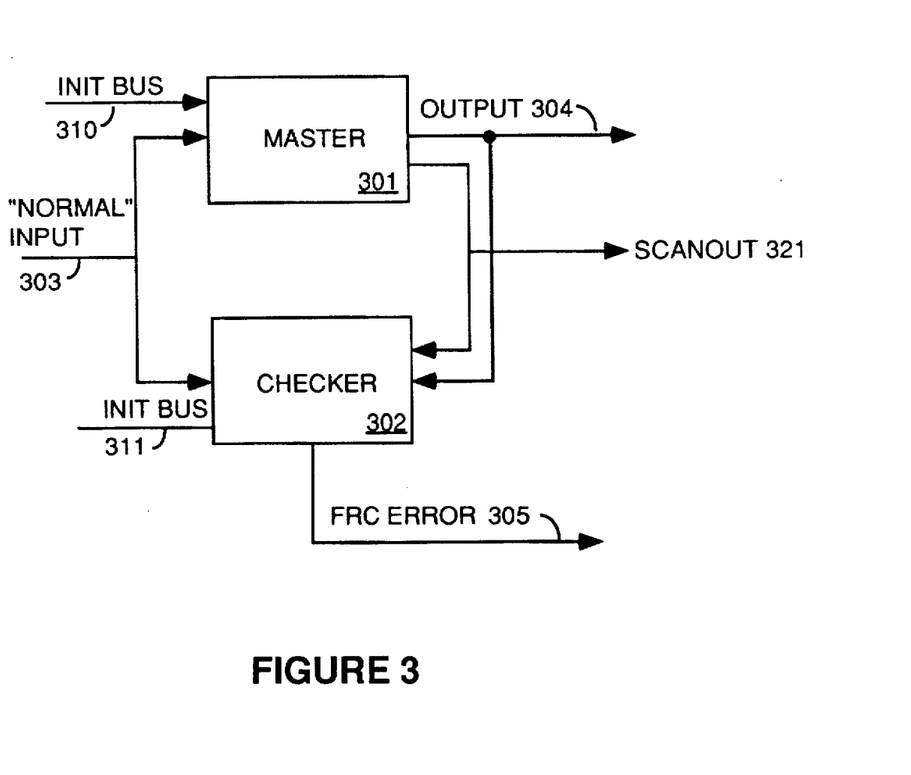
FIG. 3 illustrates one embodiment of the fault redundancy checking system of the present invention.

The functional redundancy checking (FRC) is a technique used to provide comprehensive error checking for an arbitrary logic device. In FIG. 3, the FRC uses two identical devices to implement a single "logical" device. Both devices are placed in the same state and given the same inputs, running in lock-step. Referring to FIG. 3, one device, called the master 301, drives the outputs 304 for the logical device. The outputs 304 of master 301 are also routed to the second device, the checker 302. The outputs of checker 302 are buffered but not driven. Checker 302 compares its own output values with those received from master 301. If there is any difference between the outputs 304 of master 301 and those of checker 302, then checker 302 signals an FRC error 305. In the currently preferred embodiment, the master and checker are both i960™ brand processors of Intel Corporation of Santa Clara, Calif. Thus, the i960™ processors supports FRC and can be configured as a master or checker.

Note that the processor of the present invention can toggle between the master and checker roles on each bus transaction. The master and checker may switch roles when the bus is idle. Note also that both master 301 and checker 302 are coupled to initialization bus 310 and initialization bus 311 respectively. Initialization buses 310 and 311 are coupled to provide information which is required for the initialization of master 301 and checker 302 respectively.

Overview of the Processor of the Present Invention

Figure 4:
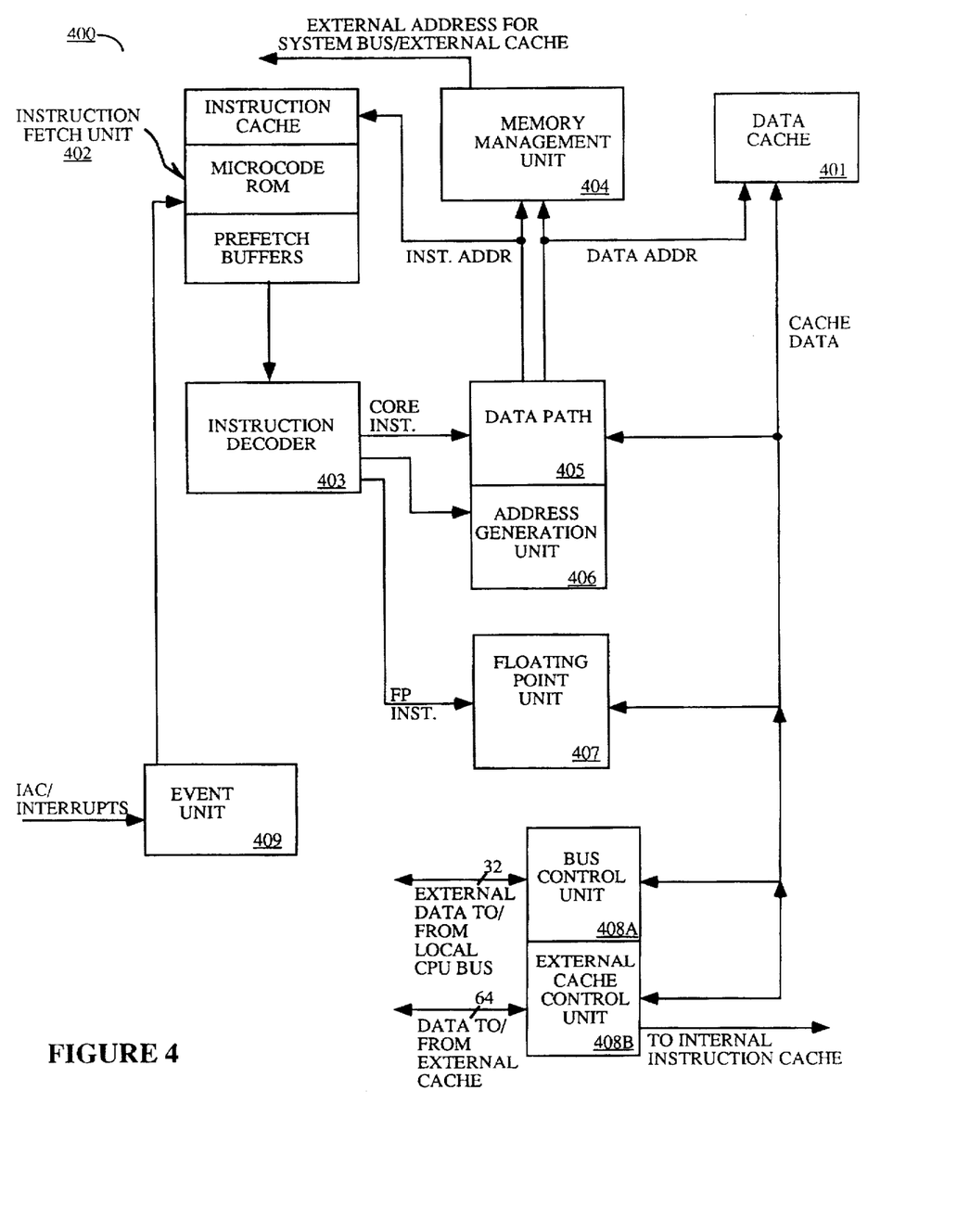
FIG. 4 illustrates one embodiment of the processor of the present invention.

FIG. 4 shows a block diagram of the processor 400, utilized by the preferred embodiment of the present invention. Processor 400 is preferably manufactured as an integrated circuit using a metal-oxide semiconductor (MOS) process. Referring to FIG. 4, processor 400 generally comprises data cache 401, instruction fetch unit 402, instruction decoder 403, datapath 405, address generator 406, floating-point unit 407, local bus or system interface and buffers 408A, memory management unit 404, external cache bus control unit 408B, and event detection unit 409. A clock generator (not shown) provides the clock signals to the components of processor 400.

Bus control unit 408A provides a data interface between processor 400 and the system, or local bus, of the computer system. Bus control unit 408A includes the bus controller and provides the necessary interface between the internal buses of processor 400, and in particular the external buses responsible for fetching data from the main memory. In the currently preferred embodiment, the present invention uses an external 32-bit address bus and a 32-bit data bus.

Instruction decoder 403 decodes the incoming instructions. Instruction decoder 403 is coupled to receive the instructions from instruction fetch unit 402 and sends the decoded instructions, in the form of microcode, to data path 405 and floating point unit 407 for execution.

Instruction fetch unit 402 includes the instruction cache and contains a microcode ROM which stores the microcode instructions (microcode) for processor 400. The microcode ROM shares control of instruction execution with instruction decoder 403 in a manner well-known in the art. The microcode ROM provides address generator 406 with address information which address generator 406 uses to generate addresses corresponding to data necessary in the execution of the decoded instructions. Address generator 406 provides the addresses for either datapath 405 or floating point unit 407 depending on the instruction type.

The microcode ROM is also responsible for instruction boundary processing, such as interrupt/exception arbitration, and the halting of instruction decoder 403 when necessary. The microcode ROM is also responsible for handling most of the freeze conditions and cache maintenance conditions, such as cache memory miss, etc.

Datapath 405 is the main execution data path for processor 400. In the currently preferred embodiment, datapath 405 is a reduced instruction set computer (RISC) core. Datapath 405 contains the arithmetic logic unit, register file, barrel shifter, read-only memory (ROM) and flags. Datapath 405 is coupled to receive data from data cache 401, and instructions from the instruction cache (via instruction fetch unit 402). Datapath 405 requests instructions from the instruction cache and data from data cache 401 via separate address lines coupled to the instruction fetch unit 402 and data cache 401. These address lines are also received by memory management unit 404 which generates external addresses to obtain data and instruction information which is not in the internal caches of the processor. In the currently preferred embodiment, memory management unit 404 includes a translation-look-aside buffer (TLB), which operates in a manner well-known in the art. Datapath 405 executes the microcode provided by instruction decoder 403 using the data received from data cache 401 according to the addresses generated by address generator 406. Processor 400 also includes floating point unit 407, which is coupled to address generator 406. Floating point unit 407 contains logic to execute the floating point instructions.

Both data cache 401 and the instruction cache of instruction fetch unit 402 are coupled to receive data and instructions from the external cache via external bus control unit 408B. Cache bus control unit 408B provides the interface necessary to the external cache. Cache bus control unit 408B includes the buffers and control circuitry necessary to interface with the external cache. The buffers include the hit/miss logic, while the control circuitry includes the tag comparison hardware, parity checking hardware, and state bits. The data bus between the external cache and the external cache bus control unit 408B in a 64-bit data path, which supplies data cache 401 with data and the internal instruction cache with instructions. Note that bus control unit 408A and cache bus control unit 408B are shown as separate units to avoid confusion. In the currently preferred embodiment, bus control unit 408A and cache bus control unit 408B are within the same unit.

The present invention also includes event unit 409 which receives interrupts and communications from the computer system including the other processor in the computer system. In response to receiving an interrupt or processor communication, event unit 409 causes the microcode to branch to a microcode routine to handle the event. This occurs in a manner well-known in the art.

Microcode Initialization In Master/Checker Fault Detecting Microprocessor

The present invention provides a microcode initialization routine in a master/checker fault detecting microprocessor computer system to ensure the processors operate in lock-step. The present invention executes the microcode routine before any memory accesses are made in order to set all internal nodes which may propagate to an external pin to a deterministic, known value. The microcode routine performs the initialization through various instructions that are necessary for initializing a node or structure, even though the instructions are not part of the normal initialization of a prior art processor.

In one embodiment, the initialization routine provides two main functions. First, the present invention uses microcode to initialize internal state of each processor to a deterministic, known value before a memory access (e.g., an output). This initialization includes pins which could be "don't cares" (i.e., uninitialized) in a microprocessor which does not support a master/checker mechanism. Second, the present invention initializes nodes used by a scan-out mechanism to prevent false master/checker errors.

The present invention uses microcode during initialization to perform several functions to ensure that the master/checker system comes up in lock-step. Furthermore, the present invention ensures that there are no "don't care" values coming out of the pins. Thus, as soon as the devices (e.g., processors) are turn on, the checking can be started immediately instead of delaying a certain period of time before beginning to check due to attempting to lock-step the processors.

In the initialization routine, known values are written into the register file in both the master and the checker. Furthermore, all of the registers are rewritten. The present invention also enters an initialization sequence which determines whether the processor is a master or a checker. This sequence is entered by both processors. In the present invention, both the master and checker determine their identity at the same time when the system is reset. Note that both of the processors are running independently. In other words, both processors initialize and run simultaneously using an identical code.

Figure 5:
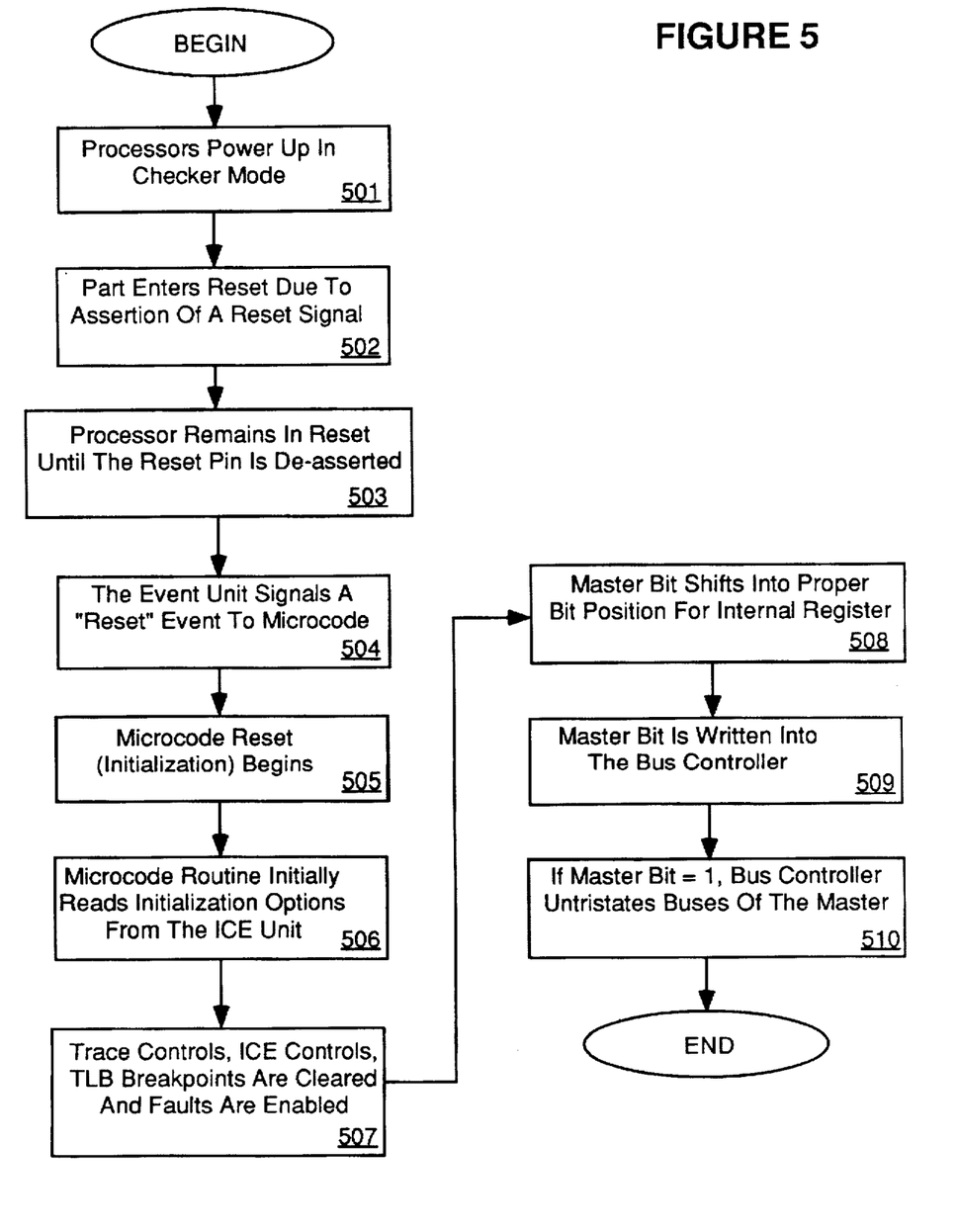
FIG. 5 is a flow chart of the initialization routine of the present invention.

The initialization routine of the present invention is depicted in FIG. 5. Referring to FIG. 5, upon the power to a microprocessor is turned on, both processors power up in the "checker" mode (processing block 501). It is very important that both processors power up as a "checker". When the two processors are coupled together, there is a risk that both parts would be a master where each is capable of driving the bus. When both processors attempt to drive the bus, their respective bus drivers burn up. Furthermore, master and checker parts are expensive. Therefore, protecting the bus drivers is of increased importance. Thus, both processors power up as checkers with their buses tri-stated.

When the power reaches a functional level, the part enters hardware reset. In one embodiment, this is due to the assertion of a reset signal (processing block 502). Both processors receive the reset signal at the same time.

Next, each processor remains in hardware reset until the reset pin is de-asserted (processing block 503). When reset is de-asserted, the event unit 409 signals a "reset" event to microcode (processing block 504). Note that the reset event is similar to an interrupt. When the reset pin is deasserted, event unit 409 which is responsible for events, such as interrupts, sends the instruction fetcher signals to begin the microcode initialization routine.

The microcode reset (initialization) then begins (processing block 505). Note that the following steps are all performed in microcode except where noted. The microcode routine initially reads from the in-circuit emulation (ICE) unit (processing block 506). Note that the use of ICE is well-known to those skilled in the art. The microcode routine performs the read operation to obtain the value placed on the ICE/initialization bus (e.g., initialization bus 310 and 311) prior to reset. This value contains various control bits including one which determines whether the processor will perform as a master or a checker. Next, all the trace controls, the ICE controls, the translation look-aside buffer (TLB) breakpoints are cleared and faults are enabled (processing block 507). Note that in one embodiment these actions are required for proper initialization before either processor goes from checker to master. The trace controls, ICE controls and TLB breakpoints are cleared so that spurious signals or unknowns do not cause events to interrupt the initialization sequence before the master/checker is set up. If, for example, some sort of trace event were to be signaled before master/checker is determined, the part would attempt to go to the event handler. Since the processor is still in checker mode, its buses are tri-stated; therefore, the part could not get to the event handler. Thus, the part would be deadlocked.

Next, the master bit is shifted into the proper bit position for the internal register (processing block 508). Then, the master bit is written into the bus controller (processing block 509). If the master bit equals 1, the bus controller untristates the buses of the master (processing block 510). Note that in one embodiment, this is done as a result of writing the bit into a control register in the bus controller (408A).

Note that all the microcode prior to the step of writing the master bit into the bus controller register occurs in the same sequence, therein requiring the same amount of time, independent of whether the master bit will be set or not. In other words, from the time the reset signal is asserted and input to both the master and the checker, both initialize at the same time.

Note that the master bit cannot be read from the initialization bus and then only sent to the bus controller if the bit is set. This would cause the following code sequence for the master and the checker:

master:
1.—read initialization bus
2.—check bit
3.—determine if it is set (in this case, yes)
4.—write bit to bus controller
5.—continue initialization checker:
1.—read initialization bus
2.—check bit
3.—determine if it is set (in this case, no)
4.—continue initialization In the example above, the "checker" part continues initialization one cycle, conceptually, before the master part. This mismatch between the two initializations means that the checker will be waiting for the bus to access one cycle before the master sends the bus access. This wait would cause a false fault redundancy checking (FRC) error to be generated when the master generates its first memory access.

The present invention avoids this problem by having both of the processors read from their respective initialization (ICE) buses at the same time to obtain their designation as master or checker. Thus, each processor writes its master bit into the bus controller, regardless of its value. In essence, steps 2, 3, and 4 occur for both the master and checker at the same time.

Setting the Initialization Values

Figure 6:
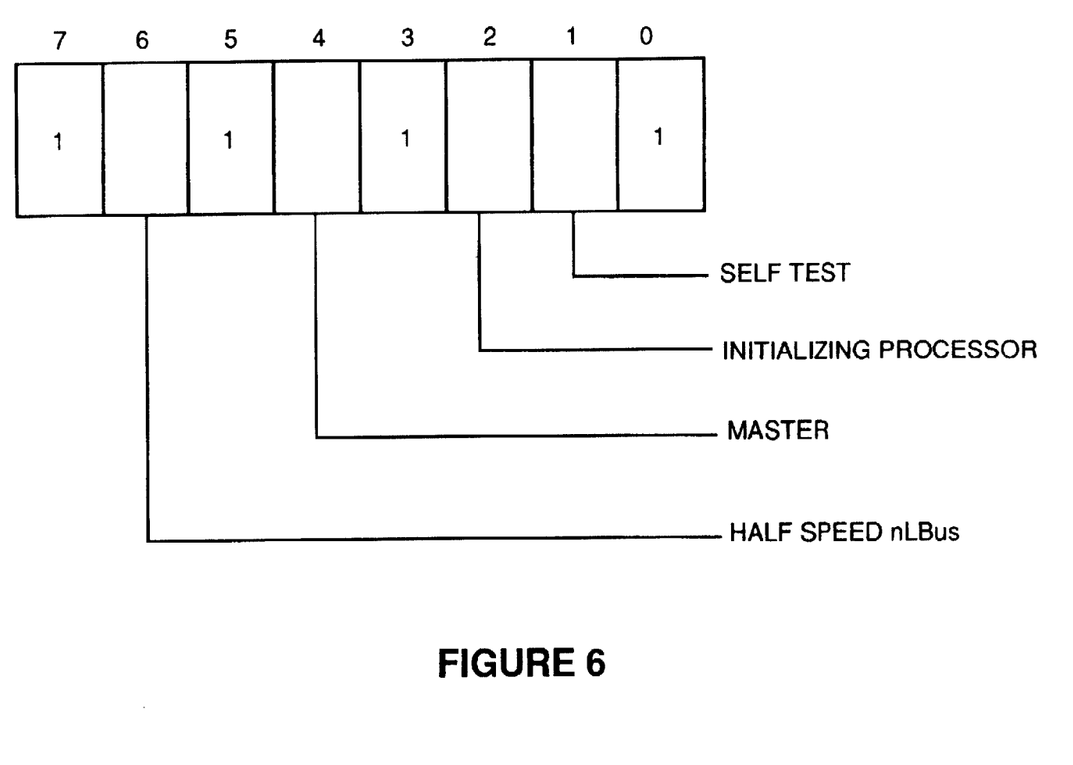
FIG. 6 illustrate one embodiment of the initialization byte of the present invention used for conveying initialization information to the processor.

The basic mechanism utilized by the present invention to set the initialization values, including the master/checker information, in order to indicate which of the processors is master and which is checker for initialization by microcode, is the initialization bus of each processor. In one embodiment, the initialization bus is a byte wide bus used to supply initialization options at hardware reset. The initialization bus is used as an ICE bus after initialization is complete. After a hardware reset, the processor reads a byte from its initialization bus. That byte specifies the initialization options. One of these options is the master bit. During initialization, microcode as described above, reads the value from latches in the ICE unit. Master bit is obtained from this value. As shown, one embodiment of the initialization options byte is shown in FIG. 6 and contains the following fields:

Self Test (bit 1)—This bit should be 1 to perform the normal internal test of the processor at initialization time. If this bit is 0, the processor skips its self-test code.

Initializing Processor (bit 2)—This bit should be 1 to perform normal initialization. If this bit is 0, the processor does not initialize and call initialization macrocode. Instead, it initializes in microcode and waits for another initialization signal (i.e., an interrupt communication (IAC)).

Master (bit 4)—If this bit is 1, the processor is the master in an FRC pair or it is not part of an FRC pair. If this bit is 0, the processor is the checker in an FRC pair.

As shown in FIG. 3, the initialization buses 310 and 311 are not shared between the two processors. Since the master bit must be different between the two processors, such that one processor is a master and one is a checker, these buses must not be coupled in the present invention.

The present invention is further complicated by a scan-out mechanism used by each processor. In the processor of the currently preferred embodiment, there is a scan-out mechanism which is part of a shift register that takes the internal state, corresponding to data resulting from the debugging process and reconstructs an internal state for the processor. This mechanism shifts out various state bits from various units and structures within the processor one bit at a time. The scanout 321 is shown being output from master 301 as an output, which is also input into checker 302. Because these bits are not deterministic, the master/checker mechanism would detect an error upon their output. Therefore, the microcode of the present invention initializes the outputs of the scan-out mechanism to a known, deterministic state. Note that in the prior art, these outputs are not initialized because they would not normally output on the pins. By initializing the scan-out mechanism when bits are shifted out one bit at a time on one of the output pins, an error will not be produced. Thus, all of this is initialized by the present invention.

The present invention also ensures that a chip is able to be correctly initialized. In other words, if a structure or unit was not initialized previously, the microcode initialization procedure of the present invention can be used to initialize the part. For example, in the case of the TLB, if some of the entries of the TLB powered up as valid, but with invalid data, then the initialization microcode could be used to make all of the entries invalid.

Therefore, the present invention is advantageous in having a microcode set all of the internal processor state to deterministic values before the first memory access leaves the chip. This action allows the present invention to start using the master/checker system in the master/checking mode from time zero (at reset). Note that in the present invention, it is not necessary for the external hardware to do any sort of an initialization of the part before the master/checker pin is turned on. This greatly simplifies the design of circuit boards using a master/checker processor pin.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a microcode initialization routine of FRC devices has been described.

I claim:

1. A method for initializing a first device and a second device coupled in a master/checker fault detecting arrangement, the method comprising the steps of:

asserting a reset signal to the first device and the second device at the same time;

designating both the first device and the second device as checkers;

signaling identical initialization microcode routines in both the first device and the second device;

the first device and the second device simultaneously and independently executing a first initialization microcode routine and a second initialization microcode routine respectively in response to the step of signaling, and further wherein each initialization microcode routine includes the steps of initializing internal state of its device to a known value, and determining whether the device is to be either a master or a checker, internally setting the device to be either a master or a checker based on determining whether the device is to be a master or checker, wherein the first microcode routine and the second microcode routine are completed at the same time, such that the first device and the second device complete initialization at the same time, thereby initializing the first device and the second device to operate in lock-step.

2. The method as defined in claim 1 wherein the step of determining further comprises the steps of:

reading at least one control signal from a memory storage element; and internally setting either the first or second device as a master or a checker according to said at least one control signal.

3. The method as defined in claim 2 wherein the step of reading comprises the steps of the first device reading a first control bit from a first memory storage element and the second device reading a second control bit from a second memory storage element, and setting either the first device or the second device to be the master if the first control bit or the second control bit respectively to a first logic state; and setting either the first device or the second device to be a checker if the first control bit or the second control bit respectively is set to a second logic.

4. The method as defined in claim 3 wherein the control bit for the first device and the second control for the second device are read from their respective in-circuit emulation (ICE) buses.

5. A method for initializing a first device and a second device coupled in a master/checker fault detecting arrangement, the method comprising the steps of:

asserting a reset signal to the first device and the second device at the same time;

designating the first device and the second device as checkers;

de-asserting the reset signal;

signaling identical initialization microcode routines in both the first device and the second device;

the first device and the second device executing simultaneously and independently, a first initialization microcode routine and a second initialization microcode routine respectively in response to the step of signaling, and further wherein each initialization microcode routine includes the steps of initializing internal state of its device to a known value, reading control information from a memory storage element, and internally setting the device as a master or a checker according to said control information;

completing the first initialization microcode routine and the second initialization microcode routine at the same time, such that the first device and the second device complete initialization at the same time, thereby initializing the first device and the second device to operate in lock-step.

6. The method as defined in claim 5 wherein the step of reading comprises the steps of the first device reading a first control bit from a first memory storage element and the second device reading a second control bit from a second memory storage element, and setting either the first device or the second device to be the master if the first control bit or the second control bit respectively is set to a first logic state; and setting either the first device or the second device is set to be a checker if the first control bit or the second control bit respectively is set to a second logic state.

7. The method as defined in claim 6 wherein the first control bit for the first device and the second control bit for the second device are read from their respective in-circuit emulation (ICE) buses.

8. A fault detecting microprocessor for use in a computer system comprising:

a first processor having a plurality of inputs and a plurality of outputs; and a second processor coupled to said first processor in a master/checker arrangement and wherein the first processor and the second processor include a first microcode unit and a second microcode unit respectively, and further wherein the first processor and the second processor are designated as checkers in response to assertion of a reset signal and the first and second microcode units are signaled to begin executing first and second initialization microcode routines respectively at the same time after deassertion of the reset signal, wherein the first and second initialization microcode routines are identical and are executed simultaneously and independently of each other, and further wherein the first and second initialization microcode routines set internal states of the first and second processors respectively for initialization to known values and cause the first and second processors to be set as either as a master or a checker according to at least one control signal, wherein the first processor and the second processor complete initialization at the same time to operate in lock-step.

9. The method as defined in claim 1 further comprising the steps of each initialization microcode routine initializing outputs of a scan-out mechanism to known, deterministic states.

10. The method as defined in claim 5 further comprising the steps of each initialization microcode routine initializing outputs of a scan-out mechanism to known, deterministic states.

11. The method as defined in claim 8 wherein each of first and second processors comprises a scan-out mechanism and further wherein each initialization microcode routine initializing outputs of a scan-out mechanism to known, deterministic states.

* * * * *